US011938918B2

(12) United States Patent
Shah et al.

(10) Patent No.: US 11,938,918 B2
(45) Date of Patent: Mar. 26, 2024

(54) MULTI-OBJECTIVE OPTIMIZATION FOR ACTIVE POWER MANAGEMENT OF SYNCHRONOUS MOTOR DRIVES

(71) Applicant: Steering Solutions IP Holding Corporation, Saginaw, MI (US)

(72) Inventors: Nakul Shah, Saginaw, MI (US); Prerit Pramod, Saginaw, MI (US); Krishna MPK Namburi, Okemos, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 44 days.

(21) Appl. No.: 17/496,241

(22) Filed: Oct. 7, 2021

(65) Prior Publication Data
US 2022/0105923 A1    Apr. 7, 2022

Related U.S. Application Data

(60) Provisional application No. 63/088,575, filed on Oct. 7, 2020.

(51) Int. Cl.
*B60W 10/08* (2006.01)
*B60L 15/20* (2006.01)

(52) U.S. Cl.
CPC ............ *B60W 10/08* (2013.01); *B60L 15/20* (2013.01); *B60L 2240/423* (2013.01); *B60W 2710/083* (2013.01)

(58) Field of Classification Search
CPC . B60W 10/08; B60W 2710/083; B60L 15/20; B60L 2240/423; Y02T 10/64; Y02T 10/72
USPC .......................................................... 701/22
See application file for complete search history.

(56) References Cited

U.S. PATENT DOCUMENTS

| 8,896,244 B2 | 11/2014 | Kleinau |
| 10,454,395 B2 * | 10/2019 | Li .................. H02P 25/024 |
| 2021/0111661 A1 | 4/2021 | Pramod et al. |
| 2021/0152112 A1 | 5/2021 | Li et al. |

\* cited by examiner

*Primary Examiner* — Yi-Kai Wang
(74) *Attorney, Agent, or Firm* — Dickinson Wright PLLC

(57) ABSTRACT

A method of controlling operation of an electric machine includes: determining a voltage-based torque limit based on a voltage constraint of a direct current (DC) bus supplying power to an inverter for powering the electric machine; determining a motor current-based torque limit based on a motor current limit; determining a supply current-based torque limit based on a supply rating, to supply current to the inverter, of the DC bus; determining a regenerative current-based torque limit based on a receive rating, to receive current from the inverter, of the DC bus; determining a final torque limit based on the voltage-based torque limit, the motor current-based torque limit, the supply current-based torque limit, and the regenerative current-based torque limit; determining a limited command torque based on a torque command and the final torque limit; and calculating at least one current command based on, at least, the limited command torque.

20 Claims, 7 Drawing Sheets

MULTI-OBJECTIVE OPTIMIZATION FOR ACTIVE POWER MANAGEMENT OF SYNCHRONOUS MOTOR DRIVES

CROSS-REFERENCES TO RELATED APPLICATIONS

This patent application claims priority to U.S. Provisional Patent Application Ser. No. 63/088,575, filed Oct. 7, 2020, which is incorporated herein by reference in its entirety.

TECHNICAL FIELD

This disclosure relates to electric machines, and in particular to controlling operation of an electric machine using a motor drive.

BACKGROUND

A vehicle, such as a car, truck, sport utility vehicle, crossover, mini-van, marine craft, aircraft, all-terrain vehicle, recreational vehicle, or other suitable vehicle, typically includes one or more electric machines, such as electric motors and the like. For example, the vehicle may include one or more multiphase electric machines, driven by corresponding electric motor drives, configured to control various aspects of a steering system of the vehicle.

Power management is an important consideration in controlling electric motor drives to regulate power being delivered to and recovered from an electric motor. Active power management involves consideration of multiple constraints simultaneously to determine achievable torque. Constraints include supply voltage, supply (regenerative) current and inverter (motor) currents. Non-linearities exist in equations representing different constraints necessitating additional algorithms to additionally arbitrate between solutions from two independent constraints.

Constraints to be considered in active power management include: voltage constraints; inverter (motor) current limits; supply and regenerative current limits; and torque command. Such voltage constraints may be based on a physical capability of the machine, including voltage limitations of the inverter, the motor, and/or other components such as interconnection wiring. Current limits can protect the drive system from damage. Supply and regenerative current limits may include externally imposed constraints (typically for vehicle power management and protection of a battery or a vehicle electrical microgrid). Typically, torque command is independent of constraints and the attempt is to ensure that the limited torque command is as close as possible to the original command.

Prioritization of different constraints may be relatively important for optimal performance of such electric machines. Prioritization of constraints depends significantly on application and use case within which the motor drive is employed.

SUMMARY

This disclosure relates generally to controlling operation of an electric machine using a motor drive.

An aspect of the disclosed embodiments includes a method of controlling operation of an electric machine. The method includes: determining a voltage-based torque limit based on a voltage constraint of a direct current (DC) bus supplying power to an inverter for powering the electric machine; determining a motor current-based torque limit based on a motor current limit; determining a supply current-based torque limit based on a supply rating, to supply current to the inverter, of the DC bus; determining a regenerative current-based torque limit based on a receive rating, to receive current from the inverter, of the DC bus; determining a final torque limit based on the voltage-based torque limit, the motor current-based torque limit, the supply current-based torque limit, and the regenerative current-based torque limit; determining a limited command torque based on a torque command and the final torque limit; and calculating at least one current command based on, at least, the limited command torque.

An aspect of the disclosed embodiments includes a control system for controlling operation of an electric machine. The control system includes a processor and a memory. The memory includes instructions that, when executed by the processor, cause the processor to: determine a voltage-based torque limit based on a voltage constraint of a direct current (DC) bus supplying power to an inverter for powering the electric machine; determine a motor current-based torque limit based on a motor current limit; determine a supply current-based torque limit based on a supply rating, to supply current to the inverter, of the DC bus; determine a regenerative current-based torque limit based on a receive rating, to receive current from the inverter, of the DC bus; determine a final torque limit based on the voltage-based torque limit, the motor current-based torque limit, the supply current-based torque limit, and the regenerative current-based torque limit; determine a limited command torque based on a torque command and the final torque limit; and calculate at least one current command based on, at least, the limited command torque.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
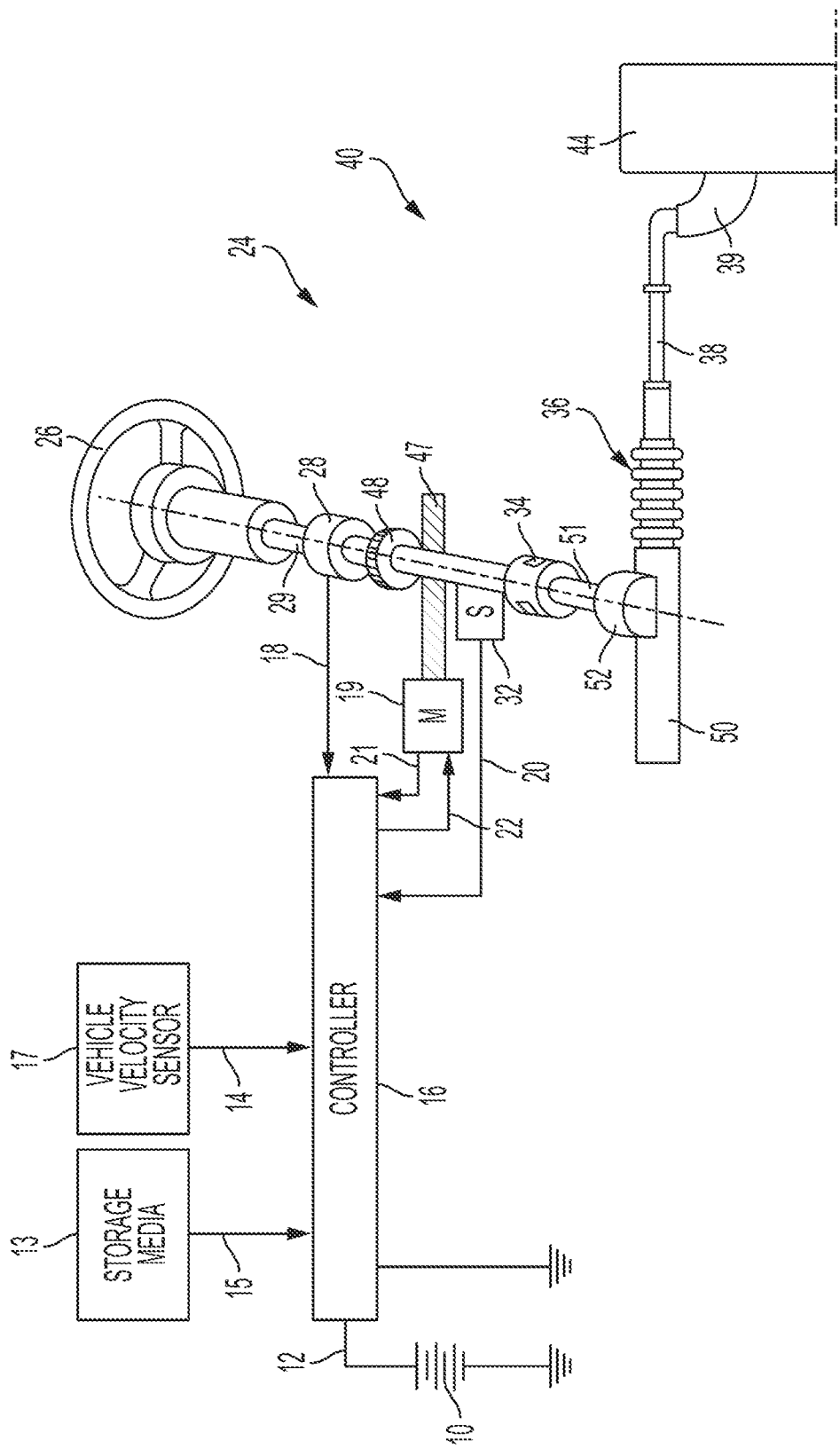
FIG. 1 generally illustrates a schematic diagram of an electric power steering system according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicle, typically includes one or more electric machines, such as electric motors and the like. For example, the vehicle may include one or more multiphase electric machines, driven by corresponding electric motor drives, configured to control various aspects of a steering system of the vehicle.

Power management is an important consideration in controlling electric motor drives to regulate power being delivered to and recovered from an electric motor. Active power management involves consideration of multiple constraints simultaneously to determine achievable torque. Constraints include supply voltage, supply (regenerative) current and inverter (motor) currents. Non-linearities exist in equations representing different constraints necessitating additional algorithms to additionally arbitrate between solutions from two independent constraints.

Constraints to be considered in active power management include: voltage constraints; inverter (motor) current limits; supply and regenerative current limits; and torque command. Such voltage constraints may be based on a physical capability of the machine, including voltage limitations of the inverter, the motor, and/or other components such as interconnection wiring. Voltage constraints may also include limitations of a supply voltage source, such as a battery pack, charging circuitry, etc. Current limits can protect the drive system from damage. Supply and regenerative current limits may include externally imposed constraints (typically for vehicle power management and protection of a battery or a vehicle electrical microgrid). Typically, torque command is independent of constraints and the attempt is to ensure that the limited torque command is as close as possible to the original command.

Prioritization of different constraints may be relatively important for optimal performance of such electric machines. Prioritization of constraints depends significantly on application and use case within which the motor drive is employed.

According to an aspect of the disclosure, a plurality of different constraints are considered simultaneously, and meeting a regenerative current constraint is prioritized over torque maximization. According to a further aspect of the disclosure, accuracy in meeting the regenerative current constraint is enhanced in low-speed operating conditions.

FIG. 1 generally illustrates a schematic diagram of an electric power steering system (EPS) 40 suitable for implementation of the disclosed techniques. The EPS includes a steering mechanism 36, which includes a rack-and-pinion type mechanism having a toothed rack (not shown) within housing 50 and a pinion gear (also not shown) located under gear housing 52. As the operator input, hereinafter denoted as a steering wheel 26 (e.g. a hand wheel and the like), is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through a control system 24, which includes the controller 16 and a motor 19, which may be a permanent magnet synchronous motor (PMSM). The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position $\theta$ as measured by a position sensor 32 over a prescribed time interval. For example, motor speed $\omega_m$ may be determined as the derivative of the motor position $\theta$ from the equation $\omega_m = \Delta\theta/\Delta t$ where $\Delta t$ is the sampling time and $\Delta\theta$ is the change in position during the sampling interval. Alternatively, motor velocity may be derived from motor position as the rate of change of position with respect to time. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the motor 19, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. controller 16 is disposed in communication with the various systems and sensors of the motor control system. controller 16 receives signals from each of the system sensors, quantifies the received information, and provides an output command signal(s) in response thereto, in this instance, for example, to the motor 19. controller 16 is configured to develop the corresponding voltage(s) out of inverter (not shown), which may optionally be incorporated with controller 16 and will be referred to herein as controller 16, such that, when applied to the motor 19, the desired torque or position is generated. In one or more examples, the controller 16 operates in a feedback control mode, as a current regulator, to generate the command 22. Alternatively, in one or more examples, the controller 16 operates in a feedforward control mode to generate the command 22. Because these voltages are related to the position and speed of the motor 19 and the desired torque, the position and/or speed of the rotor and the torque applied by an operator are determined. A position encoder is connected to the steering shaft 51 to detect the angular position θ. The encoder may sense the rotary position based on optical detection, magnetic field variations, or other methodologies. Typical position sensors include potentiometers, resolvers, synchros, encoders, and the like. The position encoder outputs a position signal 20 indicating the angular position of the steering shaft 51 and thereby, that of the motor 19.

Desired torque may be determined by one or more torque sensors 28 transmitting the torque signals 18 indicative of an applied torque. Such a torque sensor 28 and the torque signal(s) 18 therefrom, as may be responsive to a compliant torsion bar, T-bar, spring, or similar apparatus (not shown) configured to provide a response indicative of the torque applied.

The position signal 20, motor velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces.

Figure 2:
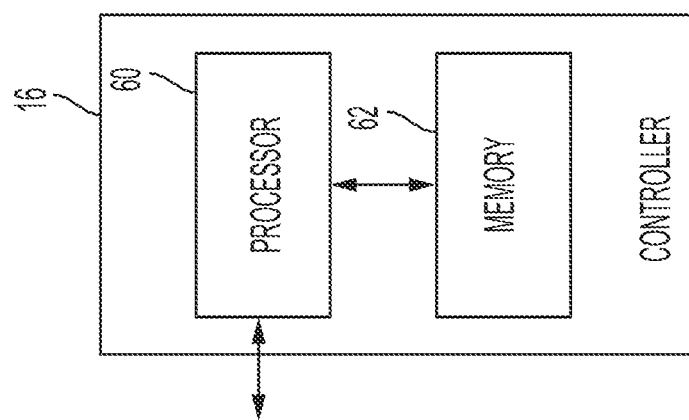
FIG. 2 generally illustrates a controller according to the principles of the present disclosure.

As is generally illustrated in FIG. 2, the controller 16 may include any suitable controller. The controller 16 may be configured to control, for example, various aspects of a vehicle, such as aspect of an electronic power steering system and/or other suitable features or components of the vehicle. The controller 16 may include a processor 60 and a memory 62.

The processor 60 may include any suitable processor, such as those described herein. Additionally, or alternatively, the controller 16 may include any suitable number of processors, in addition to or other than the processor 60. The memory 62 may comprise a single disk or a plurality of disks (e.g., hard drives), and includes a storage management module that manages one or more partitions within the memory 62. In some embodiments, memory 62 may include flash memory, semiconductor (solid state) memory or the like. The memory 62 may include Random Access Memory (RAM), a Read-Only Memory (ROM), or a combination thereof. The memory 62 may include instructions that, when executed by the processor 60, cause the processor 60 to, at least, control various functions of the vehicle.

Figure 3:
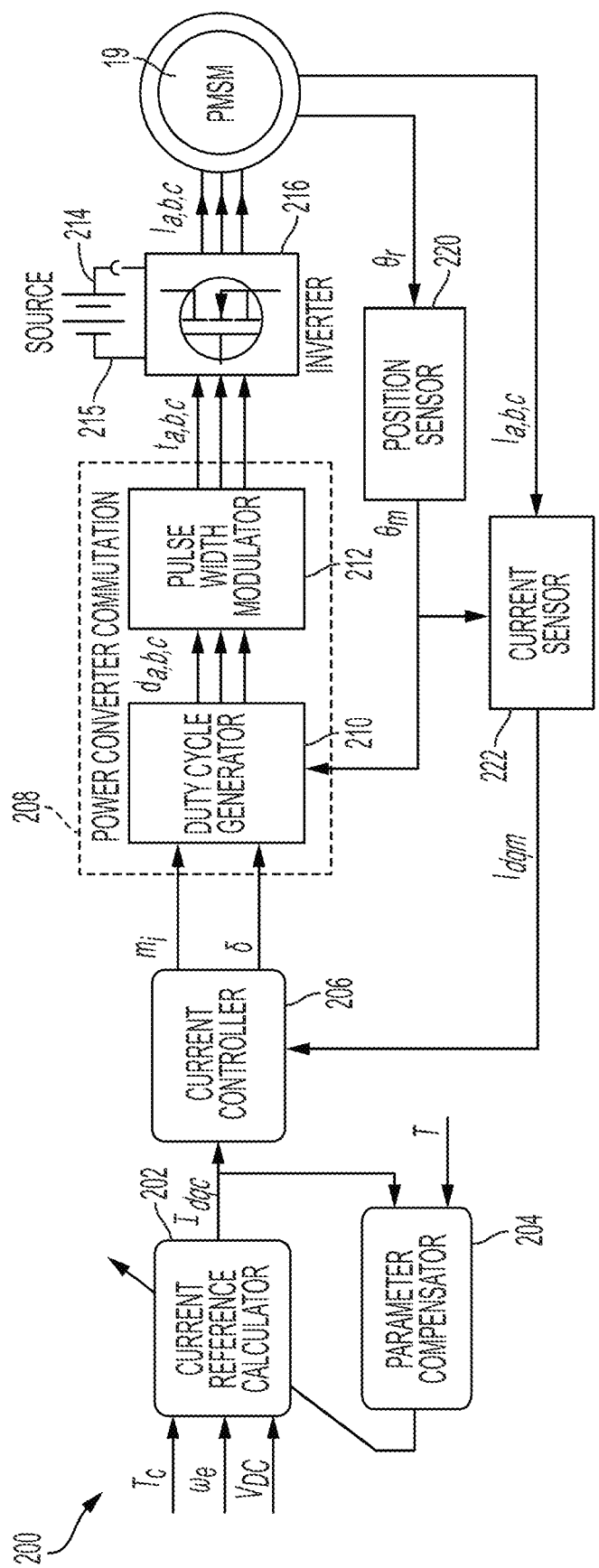
FIG. 3 generally illustrates a block diagram of an electric machine controller according to the principles of the present disclosure.

In some embodiments, the controller 16 may be configured to control various aspects of an electric machine, such as the motor control system 200, as is generally illustrated in FIG. 3. In some embodiments, as is generally illustrated, the motor control system 200 may include a three-phase PMSM controller. However, the motor control system 200 may include any suitable number of phases. Additionally, or alternatively, while the motor control system 200 is generally illustrated and described as being associated with a vehicle and the systems thereof, the motor control system 200 may be configured to control or be operatively associated with any suitable application in addition to or besides the vehicle (e.g., the motor 19 may be used in any suitable application other than a vehicle, and the principles of the present disclosure may apply accordingly).

The present disclosure provides a motor control system 200 for controlling operation of an electric machine, such as the motor 19. However, the principles of the present disclosure may be applied to controlling other types of synchronous machines. The principles of the present disclosure may be used for controlling a salient pole electric machine and/or a non-salient pole electric machine. The principles of the present disclosure may be used for controlling a wound rotor synchronous machine.

The current reference calculator 202 converts the torque command $T_c$ into d/q current references $I_{dqc}$, which are then sent to the current controller 206. The current controller 206 may be a feedback regulator utilizing current measurements or a feedforward compensator. The temperature T can be fed into a parameter compensator 204 to adjust the PMSM electrical parameters as necessary. The current controller 206 then generates the d/q voltage command, which are equivalent to a commanded modulation index $m_i$ and phase advance angle δ. The $m_i$ and δ are converted to an equivalent duty cycle signal $d_a$, $d_b$, $d_c$ for each of three phases a, b, c, respectively, by the duty cycle generator 210 of the power converter commutation module 208.

Once the equivalent duty cycle signals $d_a$, $d_b$, $d_c$ for each phase are generated, the pulse width modulator 212 then generates corresponding on-times $t_a$, $t_b$, $t_c$ for the different switches (e.g., FETs) in the phase legs of the power converter (e.g., the inverter 216). The duty cycle signals $d_a$, $d_b$, $d_c$ may be labeled $d_{a,b,c}$ collectively, and the on-times $t_a$, $t_b$, $t_c$, may be labeled $t_{a,b,c}$ collectively. The inverter 216, powered by a source 214, then supplies the desired voltages to an electric machine (e.g., the motor 19), which produces phase currents $I_a$, $I_b$, $I_c$, and electromagnetic torque $T_e$. The inverter 216 is connected to the source 214 via a direct current (DC) bus 215. The position $θ_r$ and phase currents $I_a$, $I_b$, $I_c$, are then measured and fed back to the position sensor 220 and the current sensor 222, respectively, of the control system to close the control loop. The phase currents $I_a$, $I_b$, $I_c$, may be labeled $I_{a,b,c}$ collectively. The measured position $θ_m$ is used with the phase currents to compute the d/q measured currents $I_{dqm}$ which are utilized for closed-loop current control. A voltage source inverter (VSI) is typically employed as the power converter in PMSM based electric drives. Each of the phases of the motor 19 is connected to a corresponding phase leg of the inverter 216, and each of the phase legs may have two or more switches.

While the design and structure of the actual machine are different for three phase and multiphase (greater than three phases) PMSMs, the same principle of vector control in the synchronous or d/q reference frame is possible for all these machines by using the appropriate transformation matrices for converting phase currents and voltages into the equivalent DC quantities in the synchronous frame.

Figure 4:
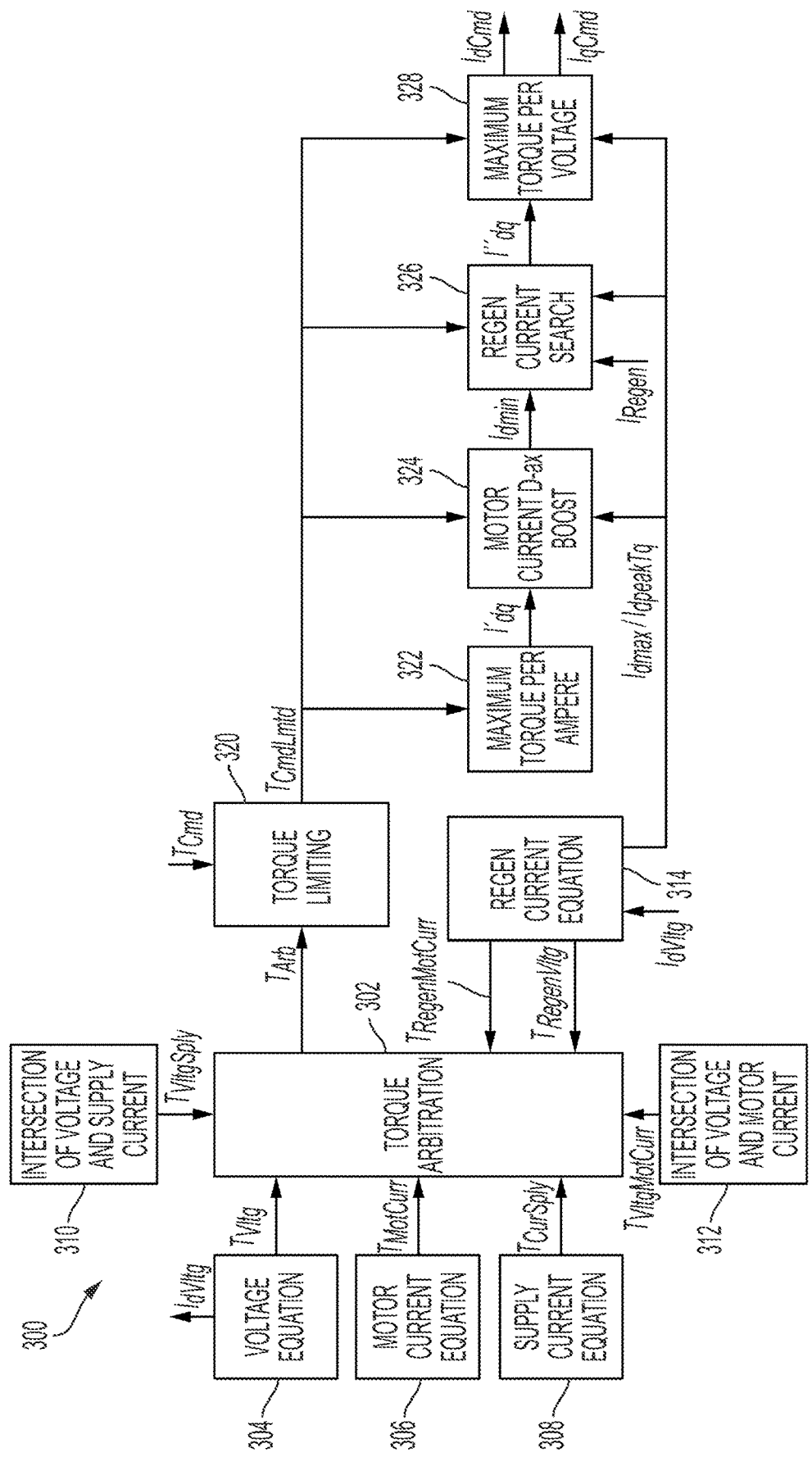
FIG. 4 generally illustrates a block diagram of an example algorithm for controlling an electric machine according to aspects of the present disclosure.

FIG. 4 generally illustrates a block diagram of an example algorithm 300 for controlling an electric machine according to aspects of the present disclosure. Specifically, the example algorithm 300 includes a torque arbitration block 302 configured to determine an arbitrated torque limit $T_{Arb}$ based on several inputs, which may include one or more of: a voltage-based torque limit $T_{Vltg}$; a motor current-based torque limit $T_{MotCurr}$; a supply current-based torque limit $T_{CurSply}$; a voltage and supply current-based torque limit $T_{VltgSply}$; a regenerative current and motor-based torque limit $T_{RegenMotCurr}$; and a regenerative current and supply voltage-based torque limit $T_{RegenVltg}$.

The example algorithm 300 includes a voltage-based torque block 304 configured to determine a voltage-based torque limit $T_{Vltg}$ based on a voltage constraint $V_{DC}$ of the DC bus 215. The voltage constraint $V_{DC}$ may include a highest voltage that the DC bus 215 is rated to operate. Alternatively or additionally, the voltage constraint $V_{DC}$ may include a voltage that the DC bus 215 is rated to operate. Operation of the DC bus 215 with a voltage outside of the voltage constraint $V_{DC}$ may have adverse results, such as equipment failure and/or damage to hardware connected to the DC bus 215. In some embodiments, the voltage-based torque block 304 may use equation (1), below, also called the voltage equation, for determining either or both of the voltage-based torque limit $T_{Vltg}$ and/or the voltage-based direct-axis current $I_{dVltg}$.

$$V_d^2 + V_q^2 \leq V_{DC}^2 \quad (1)$$

The example algorithm 300 includes a motor current-based torque block 306 configured to determine the motor current-based torque limit $T_{MotCurr}$ corresponding to the motor current $I_m$ supplied by the inverter 216 to the motor 19 satisfying a motor current limit $I_i^{lim}$. The motor current limit $I_i^{lim}$ may include a current limit of the motor 19 and/or a current limit of the inverter 216. The motor current limit $I_i^{lim}$ may be a smaller one of a current limit of the motor 19 and a current limit of the inverter 216. In some embodiments, motor current-based torque block 306 may use equation (2), below, also called the motor current equation, for determining the motor current-based torque limit $T_{MotCurr}$.

$$I_d^2 + I_q^2 \leq I_i^{lim\,2} \quad (2)$$

The example algorithm 300 includes a supply current-based torque block 308 configured to determine the supply current-based torque limit $T_{CurSply}$ corresponding to a supply current $I_s$ supplied from the DC bus 215 to the inverter 216 satisfying a supply current limit $I_{slim}$, which may also be called a supply rating. The supply current limit $I_{slim}$ may be an amount of current that the DC bus 215 is capable of supplying to the inverter 216.

In some embodiments, the supply current-based torque block 308 may use equation (3), below, for determining the supply current-based torque limit $T_{CurSply}$.

$$\frac{\sqrt{3}}{2}(V_d I_d + V_q I_q) \leq V_{dc} I_s - I_s^2 R_{dc} \quad (3)$$

The example algorithm 300 also includes a voltage and supply current-based torque block 310 configured to determine the voltage and supply current-based torque limit $T_{VltgSply}$ to satisfy the voltage constraint $V_{DC}$ of the DC bus 215 and with the supply current $I_s$ supplied from the DC bus 215 to the inverter 216 satisfying the supply current limit $I_{slim}$. In some embodiments, the voltage and supply current-based torque block 310 may determine the voltage and supply current-based torque limit $T_{VltgSply}$ based on an intersection of d-axis and q-axis currents to satisfy each of the voltage constraint $V_{DC}$ of the DC bus 215 and the supply current limit $I_{slim}$.

The example algorithm 300 also includes a voltage and motor current-based torque block 312 configured to determine the voltage and motor current-based torque limit $T_{VltgMotCurr}$ to satisfy the voltage constraint $V_{DC}$ of the DC bus 215, and with the motor current $I_m$ between inverter 216 and the motor 19 satisfying the motor current limit $I_i^{lim}$. In some embodiments, the voltage and motor current-based torque block 312 may determine the voltage and motor current-based torque limit $T_{VltgMotCurr}$ based on an intersection of d-axis and q-axis currents to satisfy each of the voltage constraint $V_{DC}$ of the DC bus 215 and the motor current limit $I_i^{lim}$.

The example algorithm 300 also includes a regen. current-based torque block 314 configured to determine one or both of the regenerative current and motor current-based torque limit $T_{RegenMotCurr}$ and/or the regenerative current and supply voltage-based torque limit $T_{RegenVltg}$. The regen. current-based torque block 314 may also determine a maximum d-axis current $I_{dmax}$ and a d-axis current to produce peak torque $I_{dpeakTq}$, which each satisfy requirements for regenerative current. The requirements for regenerative current may include a regenerative current limit $I_{Regen}$, which may also be called a receive rating. The regenerative current limit $I_{Regen}$ may be an amount of current that the DC bus 215 is capable of receiving from the inverter 216.

In some embodiments, the regen. current-based torque block 314 may use equation (4), below, for determining one or more of the maximum d-axis current $I_{dmax}$, the d-axis current to produce peak torque $I_{dpeakTq}$, the regenerative current and motor current-based torque limit $T_{RegenMotCurr}$ and/or the regenerative current and supply voltage-based torque limit $T_{RegenVltg}$.

$$\frac{\sqrt{3}}{2}(V_d I_d + V_q I_q) \leq V_{dc} I_r - I_r^2 R_{dc} \quad (4)$$

where $V_d$ and $I_d$ are d-axis voltage and current, respectively, $V_q$ and $I_q$ are q-axis voltage and current, respectively, $V_{dc}$ is the voltage of the DC bus 215, $I_r$ is the regenerative current supplied from the inverter 216 to the DC bus 215, and $R_{dc}$ is the effective resistance of the DC bus 215.

The example algorithm 300 also includes a torque limiting block 320, which determines a limited command torque $T_{CmdLmtd}$ based on a commanded torque $T_{Cmd}$ and the arbitrated torque limit $T_{Arb}$ from the torque arbitration block 302. The torque limiting block 320 may be configured to set the limited command torque $T_{CmdLmtd}$ to a lesser of the commanded torque $T_{Cmd}$ and the arbitrated torque limit $T_{Arb}$.

The example algorithm 300 also includes a maximum torque per ampere block 322, which may determine preliminary motor current values $I'_{dq}$ based on the limited command torque $T_{CmdLmtd}$. The preliminary motor current values $I'_{dq}$ may be optimized based on a maximum torque per ampere determination, which may include performing one or more calculations and/or other methods. The optimized motor current values $I'_{dq}$ may include a preliminary d-axis current $I'_d$ and a preliminary q-axis current $I'_q$.

The example algorithm 300 also includes a d-axis current boost block 324, which may be configured to determine a minimum d-axis current $I_{dmin}$ based on one or more of: the preliminary motor current values $I'_{dq}$, the limited command torque $T_{CmdLmtd}$, the maximum d-axis current $I_{dmax}$, and/or the d-axis current to produce peak torque $I_{dpeakTq}$.

The example algorithm 300 also includes a regen. current search block 326, which may be configured to determine a modified motor current $I''_{dq}$ including a modified d-axis current $I''_d$ and a modified q-axis current $I''_q$, which correspond to the inverter 216 satisfying the regenerative current limit $I_{Regen}$ of the DC bus 215. The regen. current search block 326 may determine the modified motor current $I''_{dq}$ based on one or more of: the minimum d-axis current $I_{dmin}$, the regenerative current limit $I_{Regen}$, the limited command torque $T_{CmdLmtd}$, the maximum d-axis current $I_{dmax}$, and/or the d-axis current to produce peak torque $I_{dpeakTq}$.

The example algorithm 300 also includes a maximum torque per voltage block 328, which may be configured to determine a d-axis current command $I_{dCmd}$ bond and a q-axis current command $I_{qCmd}$ may cause the motor 19 to produce a maximum torque which also satisfies the limited command torque $T_{CmdLmtd}$ and the regenerative current limit $I_{Regen}$. The maximum torque per voltage block 328 may determine the d-axis current command $I_{dCmd}$ and/or the q-axis current command $I_{qCmd}$ based on one or more of: modified motor current $I''_{dq}$, the limited command torque $T_{CmdLmtd}$, the maximum d-axis current $I_{dmax}$, and/or the d-axis current to produce peak torque $I_{dpeakTq}$.

A mathematical expression used to determine the voltage and motor current-based torque limit $T_{VltgMotCurr}$ to satisfy both the motor current limit $I_i^{lim}$, and the voltage constraint $V_{DC}$ of the DC bus 215 may include the following equations:

$$V_d = RI_d + \omega_e L_q I_q \quad (5)$$

$$V_q = RI_q + K_e \omega_m - \omega_e L_d I_d \quad (6)$$

$$T_e = 3/2 K_e I_q + 3/4 N_p (L_q - L_d) I_d I_q \quad (7)$$

FIGS. 5A-5D show graphs generally illustrating four different $I_d, I_q$ trajectories to search for a maximum torque for satisfying DC bus voltage and motor current limit constraints, $V_{DC}$ and $I_i^{lim}$, respectively, according to the principles of the present disclosure.

Figure 5A:
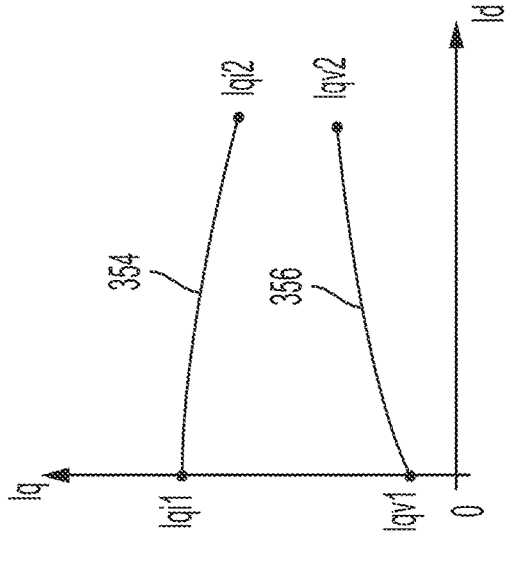
FIGS. 5A-5D show graphs generally illustrating four different $I_d, I_q$ trajectories to search for a maximum torque satisfying DC bus voltage and motor current limit constraints, according to the principles of the present disclosure.

Specifically, FIG. 5A includes a first plot 350 showing d-axis current and q-axis current $I_d, I_q$ calculated to satisfy the motor current limit $I_i^{lim}$. The first plot 350 extends between a first motor current-based q-axis current $I_{qi1}$ where the d-axis current $I_d$ is equal to a predetermined minimum value, and a second motor current-based q-axis current $I_{qi2}$ where the d-axis current $I_d$ is equal to a predetermined maximum value. The predetermined minimum value may be, for example, zero or a positive or negative value that is less than the predetermined maximum value. FIG. 5A also includes a second plot 352 showing d-axis current and q-axis current $I_d, I_q$ calculated to satisfy the voltage constraint $V_{DC}$ of the DC bus 215. The second plot 352 extends between a first voltage limit-based q-axis current $I_{qv1}$ where the d-axis current $I_d$ is equal to the predetermined minimum value, and a second voltage limit-based q-axis current $I_{qv2}$ where the d-axis current $I_d$ is equal to the predetermined maximum value.

FIG. 5A illustrates a case in which the plots 350, 352 both have positive q-axis current $I_q$ values for all d-axis current $I_d$ values, and where the first plot 350 always has a q-axis current $I_q$ value that is lower than the corresponding q-axis current $I_q$ value of the second plot 352. Thus, in this case, the voltage and motor current-based torque block 312 may set the voltage and motor current-based torque limit $T_{VltgMotCurr}$ equal to the motor current-based torque limit $T_i^{pk}$.

Figure 5B:
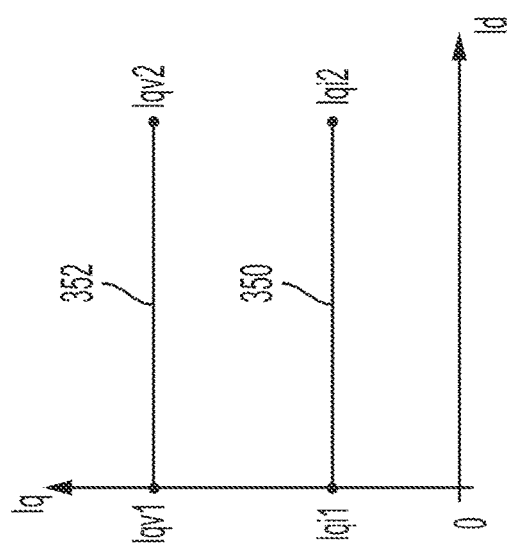

FIG. 5B includes a first plot 354 showing d-axis current and q-axis current $I_d, I_q$ calculated to satisfy the motor current limit $I_i^{lim}$. The first plot 354 extends between a first motor current-based q-axis current $I_{qi1}$ where the d-axis current $I_d$ is equal to the predetermined minimum value, and a second motor current-based q-axis current $I_{qi2}$ where the d-axis current $I_d$ is equal to a predetermined maximum value. FIG. 5B also includes a second plot 356 showing d-axis current and q-axis current $I_d, I_q$ calculated to satisfy the voltage constraint $V_{DC}$ of the DC bus 215. The second plot 356 extends between a first voltage limit-based q-axis current $I_{qv1}$ where the d-axis current $I_d$ is equal to the predetermined minimum value, and a second voltage limit-based q-axis current $I_{qv2}$ where the d-axis current $I_d$ is equal to the predetermined maximum value.

FIG. 5B illustrates a case in which the plots 354, 356 both have positive q-axis current $I_q$ values for all d-axis current $I_d$ values, and where the second plot 356 always has a q-axis current $I_q$ value that is lower than the corresponding q-axis current $I_q$ value of the first plot 354. Thus, in this case, the voltage and motor current-based torque block 312 may set the voltage and motor current-based torque limit $T_{VltgMotCurr}$ equal to the voltage-based torque limit $T_{Vltg}$.

Figure 5C:
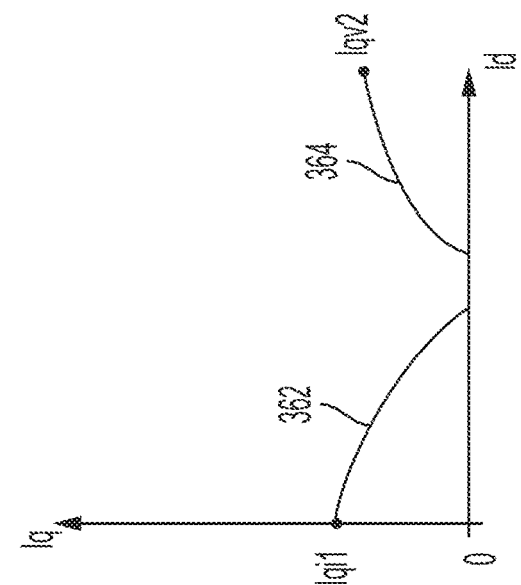

FIG. 5C includes a first plot 358 showing d-axis current and q-axis current $I_d, I_q$ calculated to satisfy the motor current limit $I_i^{lim}$. The first plot 358 extends between a first motor current-based q-axis current $I_{qi1}$ where the d-axis current $I_d$ is equal to the predetermined minimum value, and a second motor current-based q-axis current $I_{qi2}$ where the d-axis current $I_d$ is equal to a predetermined maximum value. FIG. 5C also includes a second plot 360 showing d-axis current and q-axis current $I_d, I_q$ calculated to satisfy the voltage constraint $V_{DC}$ of the DC bus 215. The second plot 360 extends between a first voltage limit-based q-axis current $I_{qv1}$ where the d-axis current $I_d$ is equal to the predetermined minimum value, and a second voltage limit-based q-axis current $I_{qv2}$ where the d-axis current $I_d$ is equal to the predetermined maximum value.

FIG. 5C illustrates a case in which the plots 358, 360 intersect each other in the illustrated region (positive values of both $I_d, I_q$). So, in the case where the current based curve and voltage based curve are intersecting, the final torque limit $T_{pk}$ should be determined based on the intersection point of the curves represented by the plots 358, 360. For example, the controller 16 may determine a d-axis intersection current value $I_{d\_int}$ where a q-axis current corresponding to the motor current limit $I_i^{lim}$ is equal to a q-axis current corresponding to the voltage constraint $V_{DC}$ of the DC bus 215 (i.e. where plots 358, 360 intersect). The controller 16 may determine the final torque limit $T_{pk}$ based on the d-axis intersection current value $I_{d\_int}$. For example, the controller 16 may determine a corresponding q-axis intersection current value $I_{q\_int}$ that satisfies both a voltage equation for satisfying the voltage constraint $V_{DC}$ of the DC bus 215, and a current equation for satisfying the motor current limit $I_i^{lim}$. The voltage equation may include equation (1), above; and the current equation may include equation (2), above. This corresponding q-axis intersection current value $I_{q\_int}$ is shown graphically on FIG. 5C. The controller 16 may then determine the final torque limit $T_{pk}$ based on the d-axis intersection current value $I_{d\_int}$ and the q-axis intersection current value $I_{q\_int}$. For example, the controller 16 may calculate the final torque limit $T_{pk}$ by plugging-in the d-axis intersection current value $I_{d\_int}$ and the q-axis intersection current value $I_{q\_int}$ to a torque equation for computing a torque based on d-axis and q-axis currents. The torque equation may include equation (7), above.

Figure 5D:
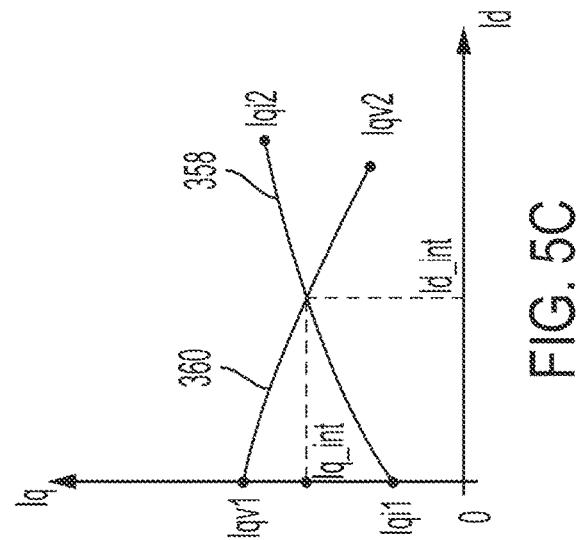

FIG. 5D includes a first plot 362 showing d-axis current and q-axis current $I_d, I_q$ calculated to satisfy the motor current limit $I_i^{lim}$. The first plot 362 extends between a first motor current-based q-axis current $I_{qi1}$ where the d-axis current $I_d$ is equal to the predetermined minimum value, and a second, negative, motor current-based q-axis current where the d-axis current $I_d$ is equal to the predetermined maximum value (not shown on the graph). FIG. 5D also includes a second plot 364 showing d-axis current and q-axis current $I_d, I_q$ calculated to satisfy the voltage constraint $V_{DC}$ of the DC bus 215. The second plot 364 extends between a first voltage limit-based q-axis current where the d-axis current $I_d$ is equal to the predetermined minimum value, and a second voltage limit-based q-axis current $I_{qv2}$ where the d-axis current $I_d$ is equal to the predetermined maximum value. The first voltage-limit-based q-axis current has a negative value and is not shown on the graph.

FIG. 5D illustrates a case in which there are no positive values of the q-axis current $I_q$ that are less than or equal to the q-axis current $I_q$ value of each of the plots 362, 364 for any d-axis current $I_d$ value. Thus, in this case, the voltage and motor current-based torque block 312 may set the voltage and motor current-based torque limit $T_{VltgMotCurr}$ equal to zero (0). In other words, the final torque limit $T_{pk}$ may be set to zero in cases where there is no direct relationship between the two curves represented by the plots 362, 364.

Figure 6:
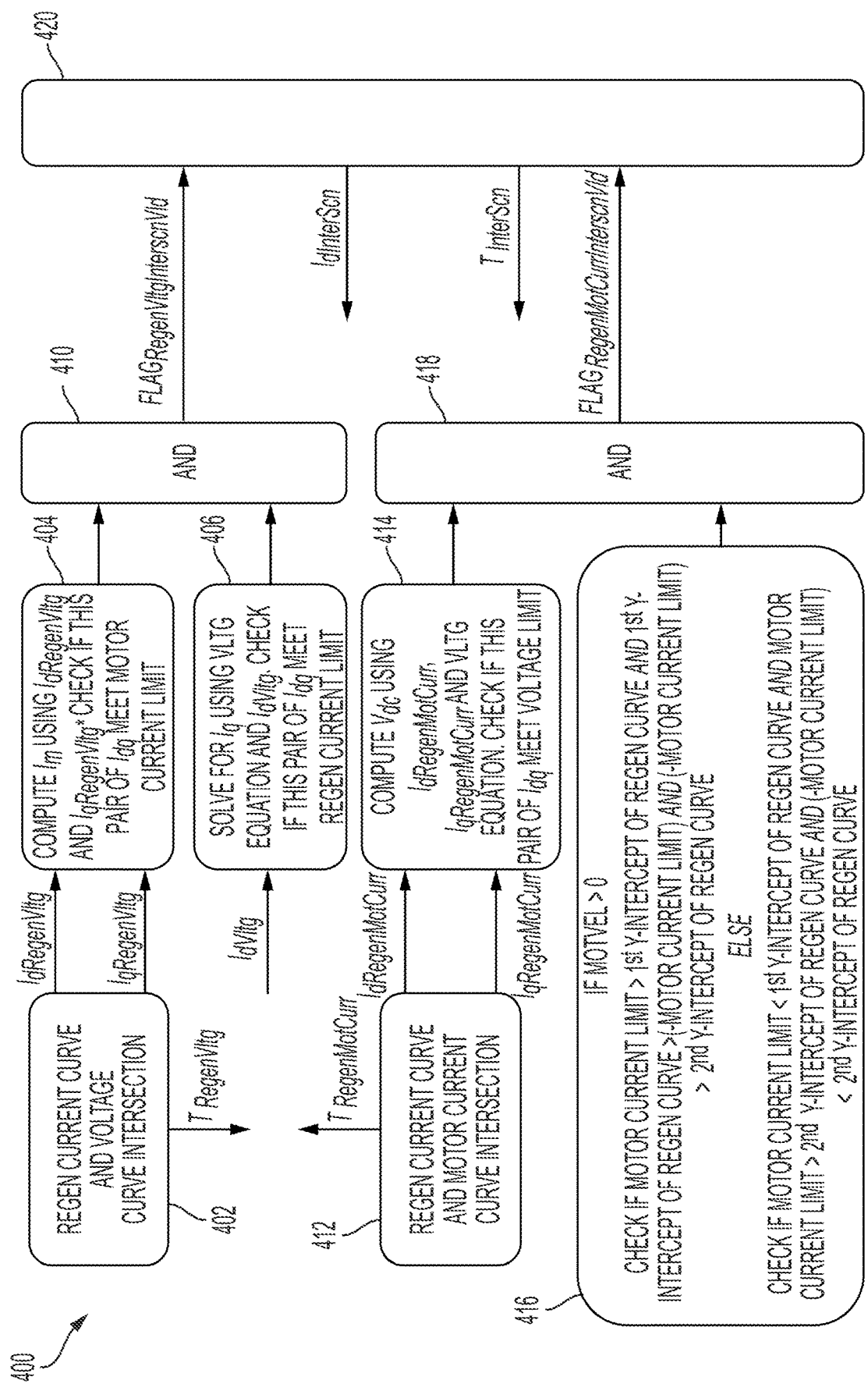
FIG. 6 generally illustrates a block diagram of a regenerative current control algorithm according to the principles of the present disclosure.
Figure 7:
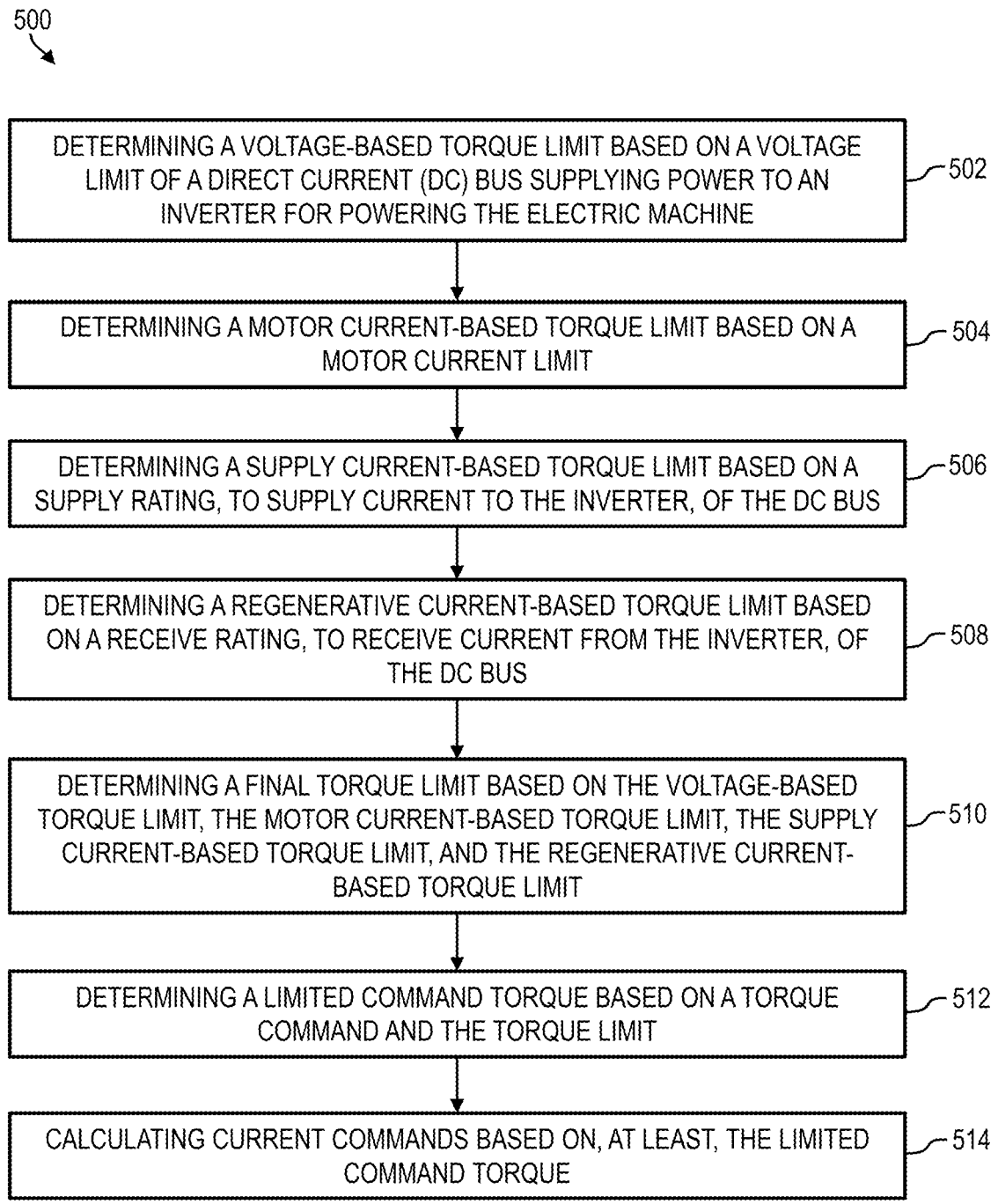
FIG. 7 shows a flow diagram generally illustrating a method of controlling operation of an electric machine, according to principles of the present disclosure.

FIG. 6 generally illustrates a block diagram of a regenerative current control algorithm 400, which may be implemented in the regen. current-based torque block 314 according to the principles of the present disclosure.

The regenerative current control algorithm 400 includes a regen. current curve and voltage curve intersection block 402, which may be configured to determine the regenerative current and supply voltage-based torque limit $T_{RegenVltg}$, a regenerative current and supply voltage based d-axis current $I_{dRegenVltg}$, and a regenerative current and supply voltage-based q-axis current $I_{qRegenVltg}$. The regen. current curve and voltage curve intersection block 402 may determine the regenerative current and supply voltage-based torque limit $T_{RegenVltg}$, the regenerative current and supply voltage-based d-axis current $I_{dRegenVltg}$, and the regenerative current and supply voltage-based q-axis current $I_{qRegenVltg}$ based on an intersection of d-axis and q-axis currents to satisfy each of the regenerative current limit $I_{Regen}$ of the DC bus 215 and the voltage constraint $V_{DC}$ of the DC bus 215. This determination may be similar to the intersection of d-axis and q-axis currents described, above, with reference to FIG. 5C.

The regenerative current control algorithm 400 also includes a motor current limit check block 404 configured to determine if the regenerative current and supply voltage-based currents $I_{dRegenVltg}$, $I_{qRegenVltg}$ meet a motor current limit $I_i^{lim}$ of the motor 19. The motor current limit check block 404 may compute a motor current $I_m$ using the regenerative current and supply voltage-based currents $I_{dRegenVltg}$, $I_{qRegenVltg}$ to determine if the regenerative current and supply voltage-based currents $I_{dRegenVltg}$, $I_{qRegenVltg}$ satisfy the motor current limit $I_i^{lim}$ of the motor 19.

The regenerative current control algorithm 400 also includes a regen. current limit check block 406 configured to determine if the voltage-based direct-axis current $I_{dVltg}$ will cause the inverter 216 to meet the regenerative current limit $I_{Regen}$. The regen. current limit check block 406 may be configured to solve for the q-axis current $I_q$, using the voltage equation and the voltage-based direct-axis current $I_{dVltg}$. The regen. current limit check block 406 may also be configured to determine if that combination of the voltage-based direct-axis current $I_{dVltg}$ and the q-axis current $I_q$ will cause the inverter 216 to meet the regenerative current limit $I_{Regen}$.

The regenerative current control algorithm 400 also includes a first AND block 410 configured to set a regen. voltage intersection valid flag $FLAG_{RegenVltgInterscnVld}$ if both the motor current limit check block 404 and the regen. current limit check block 406 indicate positive results. In other words, the first AND block 410 may set the regen. voltage intersection valid flag $FLAG_{RegenVltgInterscnVld}$ if and only if the regen-voltage-based currents $I_{dRegenVltg}$, $I_{qRegenVltg}$ meet the motor current limit $I_i^{lim}$ of the motor 19, and the voltage-based direct-axis current $I_{dVltg}$ and the q-axis current $I_q$ will cause the inverter 216 to meet the regenerative current limit $I_{Regen}$. The first AND block 410 is used to check if there is an actual intersection of regen current curve and voltage curve. The first AND block 410 may indicate that there is a valid intersection of regen current curve and voltage curve by setting the regen. voltage intersection valid flag $FLAG_{RegenVltgInterscnVld}$.

The regenerative current control algorithm 400 includes a regen. current curve and motor current curve intersection block 412, which may be configured to determine the regenerative current and motor current-based torque limit $T_{RegenMotCurr}$, a regenerative current and motor current-based d-axis current $I_{dRegenMotCurr}$, and a regenerative current and motor current-based q-axis current $I_{qRegenMotCurr}$. The regen. current curve and motor current curve intersection block 412 may determine the regenerative current and motor current-based torque limit $T_{RegenMotCurr}$, the regenerative current and motor current-based d-axis current $I_{dRegenMotCurr}$, and the regenerative current and motor current-based q-axis current $I_{qRegenMotCurr}$ based on an intersection of d-axis and q-axis currents to satisfy each of the regenerative current limit $I_{Regen}$ of the DC bus 215 and the current limit of the motor and inverter combination $I_{ilim}$. The regen-current-based currents $I_{dRegenMotCurr}$, $I_{qRegenMotCurr}$ may represent d-axis and q-axis currents that correspond to an intersection between the regenerative current curve and the motor current curve. The regenerative current and motor current-based torque limit $T_{RegenMotCurr}$ may also correspond to the intersection between the regenerative current curve and the motor current curve.

The regenerative current control algorithm 400 also includes a regen. voltage check block 414 configured to determine if the regenerative current and motor current-based currents $I_{dRegenMotCurr}$, $I_{qRegenMotCurr}$ meet the voltage constraint $V_{DC}$ of the DC bus 215, when the inverter 216 is operating in a regenerative mode, supplying power to the DC bus 215. The regen. voltage check block 414 may use the voltage equation to compute a voltage produced by the inverter 216 using the regenerative current and motor current-based currents $I_{dRegenMotCurr}$, $I_{qRegenMotCurr}$, and compare that produced voltage to the voltage constraint $V_{DC}$ of the DC bus 215 to determine if the regenerative current and motor current-based currents $I_{dRegenMotCurr}$, $I_{qRegenMotCurr}$ meet the voltage constraint $V_{DC}$ of the DC bus 215.

The regenerative current control algorithm 400 also includes a regen. permissive block 416 to determine if the inverter 216 can be operated in a regenerative mode (i.e. if it is operating in a regen. mode). The regen. permissive block 416 may determine if the motor velocity of the motor 19 is greater than zero. If the motor velocity is greater than zero, the regen. permissive block 416 may set an output Boolean value based on determining: (the motor current limit $I_i^{lim}$>$1^{st}$ y-intercept of the regen. curve) AND ($1^{st}$ y-intercept of regen. curve>(−motor current limit $I_i^{lim}$)) AND ((− motor current limit $I_i^{lim}$)>$2^{nd}$ y-intercept of regen. curve). If the motor velocity is not greater than zero, then the regen. permissive block 416 may set the output Boolean value based on determining: (the motor current limit $I_i^{lim}$<1st y-intercept of regen. curve) AND (the motor current limit $I_i^{lim}$>$2^{nd}$ y-intercept of regen. curve) AND (− motor current limit $I_i^{lim}$<$2^{nd}$ y-intercept of regen. curve). The $1^{st}$ and $2^{nd}$ y-intercepts of the regen. curve are zero-crossings of the regenerative current limit curve on a d-q axis. The $1^{st}$ y-intercept of the regen. curve is a zero-crossing on a positive axis, and the $2^{nd}$ y-intercept of the regen. curve is a zero-crossing on a negative axis.

The regenerative current control algorithm 400 also includes a second AND block 418 configured to determine if there is a valid intersection of the regen. current curve and the motor current curve. The second AND block 418 may indicate that such a valid intersection exists by setting a regen. motor current intersection valid flag $FLAG_{RegenMotCurrIntersenVld}$, if both the regen. voltage check block 414 and the regen. permissive block 416 indicate positive results. In other words, the second AND block 418 may set the regen. motor current intersection valid flag $FLAG_{RegenMotCurrIntersenVld}$ if and only if the regen-current-based currents $I_{dRegenMotCurr}$, $I_{qRegenMotCurr}$ meet the voltage constraint $V_{DC}$ of the DC bus 215, and the output Boolean value of the regen. voltage check block 414 is set.

The regenerative current control algorithm 400 also includes an intersection calculation block 420 configured to determine a d-axis intersection current $I_{dInterScn}$ and an intersection torque $T_{InterScn}$. The intersection calculation block 420 may use the regen. voltage intersection valid flag $FLAG_{RegenVltgIntersenVld}$ and the regen. motor current intersection valid flag $FLAG_{RegenMotCurrIntersenVld}$ to determine one or both of the d-axis intersection current $I_{dInterScn}$ and/or the intersection torque $T_{InterScn}$. The d-axis intersection current $I_{dInterScn}$ and the intersection torque $T_{InterScn}$ may be used by the torque arbitration block 302 to determine the arbitrated torque limit $T_{Arb}$ when there are both a motor current limit and a regen. current limit as constraints.

An intersection calculation algorithm may be used by the intersection calculation block 420 for determining the d-axis intersection current $I_{dInterScn}$ and an intersection torque $T_{InterScn}$ according to the principles of the present disclosure. The intersection calculation algorithm may include:

```
IF FLAG_RegenVltgIntersenVld AND FLAG_RegenMotCurrIntersenVld
    IF T_cmd > 0
        T_InterScn = MIN (T_RegenVltg, T_RegenMotCurr)
    ELSE
        T_InterScn = MAX (T_RegenVltg, T_RegenMotCurr)
    END
    I_dInterScn = MIN (I_dRegenVltg, I_dRegenMotCurr)
ELSE IF ~FLAG_RegenVltgIntersenVld AND FLAG_RegenMotCurrIntersenVld
    T_InterScn = T_RegenMotCurr
    I_dInterScn = I_dRegenMotCurr
```

-continued

```
ELSE IF FLAG_RegenVltgIntersenVld AND ~FLAG_RegenMotCurrIntersenVld
    T_InterScn = T_RegenVltg
    I_dInterScn = I_dRegenVltg
ELSE
    IF T_cmd ≥ 0
        T_InterScn = TORQUE HIGH LIMIT
    ELSE
        T_InterScn = TORQUE LOW LIMIT
    END
    I_dInterScn = I_dVltg
END
``` where MIN and MAX are provide minimum and maximum values, respectively, and ~ represents a logical negation.

FIG. 8 shows a flow diagram generally illustrating a method 500 of controlling operation of an electric machine. The method 500 may prioritize meeting the regenerative current limit of the direct current bus over achieving the torque command. At 502, the method 500 determines a voltage-based torque limit based on a voltage constraint of a direct current (DC) bus supplying power to an inverter for powering the electric machine. For example, the processor 102 may execute instructions implementing the voltage-based torque block 304.

At 504, the method 500 determines a motor current-based torque limit based on a motor current limit. For example, the processor 102 may execute instructions implementing the motor current-based torque block 306.

At 506, the method 500 determines a supply current-based torque limit based on a supply rating, to supply current to the inverter, of the DC bus. For example, the processor 102 may execute instructions implementing the supply current-based torque block 308.

At 508, the method 500 determines a regenerative current-based torque limit based on a receive rating, to receive current from the inverter, of the DC bus. For example, the processor 102 may execute instructions implementing the regen. current-based torque block 314.

At 510, the method 500 determines a final torque limit based on the voltage-based torque limit, the motor current-based torque limit, the supply current-based torque limit, and the regenerative current-based torque limit. For example, the processor 102 may execute instructions implementing the torque arbitration block 302.

At 512, the method 500 determines a limited command torque based on a torque command and the torque limit. For example, the processor 102 may execute instructions implementing the torque limiting block 320 to determine the limited command torque $T_{CmdLmtd}$ based on a commanded torque $T_c$ and the arbitrated torque limit $T_{Arb}$. More specifically, the torque limiting block 320 may set the limited command torque $T_{CmdLmtd}$ as the commanded torque $T_c$, limited not to exceed the arbitrated torque limit $T_{Arb}$.

At 514, the method 500 calculates current commands based on, at least, the limited command torque. For example, the processor 102 may execute instructions implementing combination of one or more of blocks 322-328 to determine d-axis and q-axis current commands $I_{dCmd}$, $I_{qCmd}$ for controlling operation the inverter 216. More specifically, the combination of one or more of blocks 322-328 may calculate the d-axis and q-axis current commands $I_{dCmd}$, $I_{qCmd}$ based on the limited command torque $T_{CmdLmtd}$ using on a maximum torque per ampere determination to optimize the current commands $I_{dCmd}$, $I_{qCmd}$ for torque production and/or a maximum torque per voltage determination to optimize the current commands $I_{dCmd}$, $I_{qCmd}$ for voltage to be applied to the motor 19.

A method of controlling operation of an electric machine includes: determining a voltage-based torque limit based on a voltage constraint of a direct current (DC) bus supplying power to an inverter for powering the electric machine; determining a motor current-based torque limit based on a motor current limit; determining a supply current-based torque limit based on a supply rating, to supply current to the inverter, of the DC bus; determining a regenerative current-based torque limit based on a receive rating, to receive current from the inverter, of the DC bus; determining a final torque limit based on the voltage-based torque limit, the motor current-based torque limit, the supply current-based torque limit, and the regenerative current-based torque limit; determining a limited command torque based on a torque command and the final torque limit; and calculating at least one current command based on, at least, the limited command torque. The method may prioritize meeting the regenerative current limit of the direct current bus over achieving the torque command.

In some embodiments, the method further includes selectively controlling a plurality of switches within the inverter to cause the inverter to supply a current to the electric machine based on the at least one current command.

In some embodiments, the motor current limit is a lesser one of a current limit of the electric machine and a current limit of the inverter.

In some embodiments, determining the final torque limit further comprises arbitrating between the voltage-based torque limit and the motor current-based torque limit.

In some embodiments, arbitrating between the voltage-based torque limit and the motor current-based torque limit further comprises: determining a first motor current-based q-axis current corresponding to a d-axis current having a predetermined minimum value and corresponding to the motor current limit; determining a second motor current-based q-axis current corresponding to the d-axis current having a predetermined maximum value and corresponding to the motor current limit; determining a first voltage limit-based q-axis current corresponding to a d-axis current having a predetermined minimum value and corresponding to the voltage constraint of the DC bus; determining a second voltage limit-based q-axis current corresponding to the d-axis current having a predetermined maximum value and corresponding to the voltage constraint of the DC bus; determining one of the first motor current-based q-axis current and the first voltage limit-based q-axis current having a lesser value; determining one of the second motor current-based q-axis current and the second voltage limit-based q-axis current having a lesser value; and selecting one of the motor current-based torque limit and the voltage-based torque limit based on the one of the first motor current-based q-axis current and the first voltage limit-based q-axis current having the lesser value and based on the one of the second motor current-based q-axis current and the second voltage limit-based q-axis current having the lesser value.

In some embodiments, selecting the one of the motor current-based torque limit and the voltage-based torque limit further comprises: selecting the motor current-based torque limit as the final torque limit in response to determining the first motor current-based q-axis current being less than the first voltage limit-based q-axis current, and the second motor current-based q-axis current being less than the second voltage limit-based q-axis current; and selecting the voltage-based torque limit as the final torque limit in response to determining the first voltage limit-based q-axis current being less than the first motor current-based q-axis current, and the second voltage limit-based q-axis current being less than the second motor current-based q-axis current.

In some embodiments, arbitrating between the voltage-based torque limit and the motor current-based torque limit further comprises: determining a first motor current-based q-axis current corresponding to a d-axis current having a predetermined minimum value and corresponding to the motor current limit; determining a second motor current-based q-axis current corresponding to the d-axis current having a predetermined maximum value and corresponding to the motor current limit; determining a first voltage limit-based q-axis current corresponding to a d-axis current having a predetermined minimum value and corresponding to the voltage constraint of the DC bus; determining a second voltage limit-based q-axis current corresponding to the d-axis current having a predetermined maximum value and corresponding to the voltage constraint of the DC bus; determining one of the first motor current-based q-axis current and the first voltage limit-based q-axis current having a lesser value; determining one of the second motor current-based q-axis current and the second voltage limit-based q-axis current having a lesser value; determining the one of the second motor current-based q-axis current and the second voltage limit-based q-axis current having the lesser value corresponding to a different constraint from the one of the first motor current-based q-axis current and the first voltage limit-based q-axis current having the lesser value; determining a d-axis intersection current value where a q-axis current corresponding to the motor current limit is equal to a q-axis current corresponding to the voltage constraint of the DC bus; and determining the final torque limit based on the d-axis intersection current value and based on the q-axis current corresponding to each of motor current limit and the voltage constraint of the DC bus.

In some embodiments, determining the regenerative current-based torque limit includes determining a regenerative current and motor current-based torque limit based on an intersection of d-axis and q-axis currents to satisfy each of the receive rating and the motor current limit. For example, the regen. current-based torque block 314 and/or the regen. current curve and motor current curve intersection block 412 may perform these functions.

In some embodiments, the method further includes calculating a voltage generated by the inverter based on the regenerative current and motor current-based current limit; and determining if the voltage generated by the inverter based on the regenerative current and motor current-based current limit satisfies the voltage constraint of the DC bus to verify the intersection of d-axis and q-axis currents to satisfy each of the receive rating and the motor current limit. For example, the regen. voltage check block 414 and/or the second AND block 418 may perform these functions.

In some embodiments, the method further includes calculating a first y-intercept of a plot of d-axis current versus q-axis current, with the d-axis current and the q-axis current each corresponding to the inverter satisfying the receive rating; calculating a second y-intercept of the plot of d-axis current versus q-axis current, with the d-axis current and the q-axis current each corresponding to the inverter satisfying the receive rating; and determining if the electric machine can be operated in an a regenerative mode while satisfying the motor current limit, including, based on a velocity of the electric machine, one of: a) determining if the motor current limit is greater than the first y-intercept of the plot of d-axis current versus q-axis current, and the first y-intercept of the plot of d-axis current versus q-axis current is greater than a negation of the motor current limit, and the negation of the motor current limit is greater than the second y-intercept of the plot of d-axis current versus q-axis current; and b) determining if: the motor current limit is less than the first y-intercept of the plot of d-axis current versus q-axis current, and the motor current limit is greater than the second y-intercept of the plot of d-axis current versus q-axis current, and the negation of the motor current limit is less than the second y-intercept of the plot of d-axis current versus q-axis current. In some embodiments, step a) may be performed if the velocity of the electric machine is greater than zero, and step b) may be performed if the velocity of the electric machine is less than or equal to zero. For example, the regen. permissive block 416 and/or the second AND block 418 may perform these functions.

In some embodiments, a control system for controlling operation of an electric machine includes a processor and a memory. The memory includes instructions that, when executed by the processor, cause the processor to: determine a voltage-based torque limit based on a voltage constraint of a direct current (DC) bus supplying power to an inverter for powering the electric machine; determine a motor current-based torque limit based on a motor current limit; determine a supply current-based torque limit based on a supply rating, to supply current to the inverter, of the DC bus; determine a regenerative current-based torque limit based on a receive rating, to receive current from the inverter, of the DC bus; determine a final torque limit based on the voltage-based torque limit, the motor current-based torque limit, the supply current-based torque limit, and the regenerative current-based torque limit; determine a limited command torque based on a torque command and the final torque limit; and calculate at least one current command based on, at least, the limited command torque.

In some embodiments, the instructions further cause the processor to selectively control a plurality of switches within the inverter to cause the inverter to supply a current to the electric machine based on the at least one current command.

In some embodiments, the motor current limit is a lesser one of a current limit of the electric machine and a current limit of the inverter.

In some embodiments, determining the final torque limit further comprises arbitrating between the voltage-based torque limit and the motor current-based torque limit.

In some embodiments, arbitrating between the voltage-based torque limit and the motor current-based torque limit further comprises the instructions causing the processor to: determine a first motor current-based q-axis current corresponding to a d-axis current having a predetermined minimum value and corresponding to the motor current limit; determine a second motor current-based q-axis current corresponding to the d-axis current having a predetermined maximum value and corresponding to the motor current limit; determine a first voltage limit-based q-axis current corresponding to a d-axis current having a predetermined minimum value and corresponding to the voltage constraint of the DC bus; determine a second voltage limit-based q-axis current corresponding to the d-axis current having a predetermined maximum value and corresponding to the voltage constraint of the DC bus; determine one of the first motor current-based q-axis current and the first voltage limit-based q-axis current having a lesser value; determine one of the second motor current-based q-axis current and the second voltage limit-based q-axis current having a lesser value; and select one of the motor current-based torque limit and the voltage-based torque limit based on the one of the first motor current-based q-axis current and the first voltage limit-based q-axis current having the lesser value and based on the one of the second motor current-based q-axis current and the second voltage limit-based q-axis current having the lesser value.

In some embodiments, selecting the one of the motor current-based torque limit and the voltage-based torque limit further comprises the instructions causing the processor to: select the motor current-based torque limit as the final torque limit in response to determining the first motor current-based q-axis current being less than the first voltage limit-based q-axis current, and the second motor current-based q-axis current being less than the second voltage limit-based q-axis current; and select the voltage-based torque limit as the final torque limit in response to determining the first voltage limit-based q-axis current being less than the first motor current-based q-axis current, and the second voltage limit-based q-axis current being less than the second motor current-based q-axis current.

In some embodiments, arbitrating between the voltage-based torque limit and the motor current-based torque limit further comprises the instructions causing the processor to: determine a first motor current-based q-axis current corresponding to a d-axis current having a predetermined minimum value and corresponding to the motor current limit; determine a second motor current-based q-axis current corresponding to the d-axis current having a predetermined maximum value and corresponding to the motor current limit; determine a first voltage limit-based q-axis current corresponding to a d-axis current having a predetermined minimum value and corresponding to the voltage constraint of the DC bus; determine a second voltage limit-based q-axis current corresponding to the d-axis current having a predetermined maximum value and corresponding to the voltage constraint of the DC bus; determine one of the first motor current-based q-axis current and the first voltage limit-based q-axis current having a lesser value; determine one of the second motor current-based q-axis current and the second voltage limit-based q-axis current having a lesser value; determine the one of the second motor current-based q-axis current and the second voltage limit-based q-axis current having the lesser value corresponding to a different constraint from the one of the first motor current-based q-axis current and the first voltage limit-based q-axis current having the lesser value; determine a d-axis intersection current value where a q-axis current corresponding to the motor current limit is equal to a q-axis current corresponding to the voltage constraint of the DC bus; and determine the final torque limit based on the d-axis intersection current value and based on the q-axis current corresponding to each of motor current limit and the voltage constraint of the DC bus.

In some embodiments, determining the regenerative current-based torque limit further comprises the instructions causing the processor to determine a regenerative current and motor current-based torque limit based on an intersection of d-axis and q-axis currents to satisfy each of the receive rating and the motor current limit. For example, the instructions may include the regen. current-based torque block 314 and/or the regen. current curve and motor current curve intersection block 412 to perform these functions.

In some embodiments, the instructions further cause the processor to calculate a voltage generated by the inverter based on the regenerative current and motor current-based current limit; and determine if the voltage generated by the inverter based on the regenerative current and motor current-based current limit satisfies the voltage constraint of the DC bus to verify the intersection of d-axis and q-axis currents to satisfy each of the receive rating and the motor current limit.

For example, the instructions may include the regen. voltage check block 414 and/or the second AND block 418 to perform these functions.

In some embodiments, the instructions further cause the processor to calculate a first y-intercept of a plot of d-axis current versus q-axis current, with the d-axis current and the q-axis current each corresponding to the inverter satisfying the receive rating; calculate a second y-intercept of the plot of d-axis current versus q-axis current, with the d-axis current and the q-axis current each corresponding to the inverter satisfying the receive rating; and determine if the electric machine can be operated in an a regenerative mode while satisfying the motor current limit, including, based on a velocity of the electric machine, one of: a) determine if the motor current limit is greater than the first y-intercept of the plot of d-axis current versus q-axis current, and the first y-intercept of the plot of d-axis current versus q-axis current is greater than a negation of the motor current limit, and the negation of the motor current limit is greater than the second y-intercept of the plot of d-axis current versus q-axis current; and b) determine if: the motor current limit is less than the first y-intercept of the plot of d-axis current versus q-axis current, and the motor current limit is greater than the second y-intercept of the plot of d-axis current versus q-axis current, and the negation of the motor current limit is less than the second y-intercept of the plot of d-axis current versus q-axis current. In some embodiments, step a) may be performed if the velocity of the electric machine is greater than zero, and step b) may be performed if the velocity of the electric machine is less than or equal to zero. For example, the instructions may include the regen. permissive block 416 and/or the second AND block 418 to perform these functions.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A method of controlling operation of an electric machine, comprising:
   determining a voltage-based torque limit based on a voltage constraint of a direct current (DC) bus supplying power to an inverter for powering the electric machine;
   determining a motor current-based torque limit based on a motor current limit;
   determining a supply current-based torque limit based on a supply rating, to supply current to the inverter, of the DC bus;
   determining a regenerative current-based torque limit based on a receive rating, to receive current from the inverter, of the DC bus;
   determining a final torque limit based on the voltage-based torque limit, the motor current-based torque limit, the supply current-based torque limit, and the regenerative current-based torque limit;

determining a limited command torque based on a torque command and the final torque limit; and calculating at least one current command based on, at least, the limited command torque.

2. The method of claim 1, further comprising selectively controlling a plurality of switches within the inverter to cause the inverter to supply a current to the electric machine based on the at least one current command.

3. The method of claim 1, wherein the motor current limit is a lesser one of a current limit of the electric machine and a current limit of the inverter.

4. The method of claim 1, wherein determining the final torque limit further comprises arbitrating between the voltage-based torque limit and the motor current-based torque limit.

5. The method of claim 4, wherein arbitrating between the voltage-based torque limit and the motor current-based torque limit further comprises:

determining a first motor current-based q-axis current corresponding to a d-axis current having a predetermined minimum value and corresponding to the motor current limit;

determining a second motor current-based q-axis current corresponding to the d-axis current having a predetermined maximum value and corresponding to the motor current limit;

determining a first voltage limit-based q-axis current corresponding to a d-axis current having a predetermined minimum value and corresponding to the voltage constraint of the DC bus;

determining a second voltage limit-based q-axis current corresponding to the d-axis current having a predetermined maximum value and corresponding to the voltage constraint of the DC bus;

determining one of the first motor current-based q-axis current and the first voltage limit-based q-axis current having a lesser value;

determining one of the second motor current-based q-axis current and the second voltage limit-based q-axis current having a lesser value; and selecting one of the motor current-based torque limit and the voltage-based torque limit based on the one of the first motor current-based q-axis current and the first voltage limit-based q-axis current having the lesser value and based on the one of the second motor current-based q-axis current and the second voltage limit-based q-axis current having the lesser value.

6. The method of claim 5, wherein selecting the one of the motor current-based torque limit and the voltage-based torque limit further comprises:

selecting the motor current-based torque limit as the final torque limit in response to determining the first motor current-based q-axis current being less than the first voltage limit-based q-axis current, and the second motor current-based q-axis current being less than the second voltage limit-based q-axis current; and selecting the voltage-based torque limit as the final torque limit in response to determining the first voltage limit-based q-axis current being less than the first motor current-based q-axis current, and the second voltage limit-based q-axis current being less than the second motor current-based q-axis current.

7. The method of claim 4, wherein arbitrating between the voltage-based torque limit and the motor current-based torque limit further comprises:

determining a first motor current-based q-axis current corresponding to a d-axis current having a predetermined minimum value and corresponding to the motor current limit;

determining a second motor current-based q-axis current corresponding to the d-axis current having a predetermined maximum value and corresponding to the motor current limit;

determining a first voltage limit-based q-axis current corresponding to a d-axis current having a predetermined minimum value and corresponding to the voltage constraint of the DC bus;

determining a second voltage limit-based q-axis current corresponding to the d-axis current having a predetermined maximum value and corresponding to the voltage constraint of the DC bus;

determining one of the first motor current-based q-axis current and the first voltage limit-based q-axis current having a lesser value;

determining one of the second motor current-based q-axis current and the second voltage limit-based q-axis current having a lesser value;

determining the one of the second motor current-based q-axis current and the second voltage limit-based q-axis current having the lesser value corresponding to a different constraint from the one of the first motor current-based q-axis current and the first voltage limit-based q-axis current having the lesser value;

determining a d-axis intersection current value where a q-axis current corresponding to the motor current limit is equal to a q-axis current corresponding to the voltage constraint of the DC bus; and determining the final torque limit based on the d-axis intersection current value and based on the q-axis current corresponding to each of motor current limit and the voltage constraint of the DC bus.

8. The method of claim 1, wherein determining the regenerative current-based torque limit includes determining a regenerative current and motor current-based torque limit based on an intersection of d-axis and q-axis currents to satisfy each of the receive rating and the motor current limit.

9. The method of claim 8, further comprising:

calculating a voltage generated by the inverter based on the regenerative current and motor current-based current limit; and determining if the voltage generated by the inverter based on the regenerative current and motor current-based current limit satisfies the voltage constraint of the DC bus to verify the intersection of d-axis and q-axis currents to satisfy each of the receive rating and the motor current limit.

10. The method of claim 1, further comprising:

calculating a first y-intercept of a plot of d-axis current versus q-axis current, with the d-axis current and the q-axis current each corresponding to the inverter satisfying the receive rating;

calculating a second y-intercept of the plot of d-axis current versus q-axis current, with the d-axis current and the q-axis current each corresponding to the inverter satisfying the receive rating; and determining if the electric machine can be operated in an a regenerative mode while satisfying the motor current limit, including, based on a velocity of the electric machine, one of:

determining if the motor current limit is greater than the first y-intercept of the plot of d-axis current versus q-axis current, and the first y-intercept of the plot of d-axis current versus q-axis current is greater than a negation of the motor current limit, and the negation of the motor current limit is greater than the second y-intercept of the plot of d-axis current versus q-axis current; and determining if: the motor current limit is less than the first y-intercept of the plot of d-axis current versus q-axis current, and the motor current limit is greater than the second y-intercept of the plot of d-axis current versus q-axis current, and the negation of the motor current limit is less than the second y-intercept of the plot of d-axis current versus q-axis current.

11. A control system for controlling operation of an electric machine, comprising:
a processor; and
a memory that includes instructions that, when executed by the processor, cause the processor to:
determine a voltage-based torque limit based on a voltage constraint of a direct current (DC) bus supplying power to an inverter for powering the electric machine;
determine a motor current-based torque limit based on a motor current limit;
determine a supply current-based torque limit based on a supply rating, to supply current to the inverter, of the DC bus;
determine a regenerative current-based torque limit based on a receive rating, to receive current from the inverter, of the DC bus;
determine a final torque limit based on the voltage-based torque limit, the motor current-based torque limit, the supply current-based torque limit, and the regenerative current-based torque limit;
determine a limited command torque based on a torque command and the final torque limit; and
calculate at least one current command based on, at least, the limited command torque.

12. The control system of claim 11, wherein the instructions further cause the processor to selectively control a plurality of switches within the inverter to cause the inverter to supply a current to the electric machine based on the at least one current command.

13. The control system of claim 11, wherein the motor current limit is a lesser one of a current limit of the electric machine and a current limit of the inverter.

14. The control system of claim 11, wherein determining the final torque limit further comprises arbitrating between the voltage-based torque limit and the motor current-based torque limit.

15. The control system of claim 14, wherein arbitrating between the voltage-based torque limit and the motor current-based torque limit further comprises the instructions causing the processor to:
determine a first motor current-based q-axis current corresponding to a d-axis current having a predetermined minimum value and corresponding to the motor current limit;
determine a second motor current-based q-axis current corresponding to the d-axis current having a predetermined maximum value and corresponding to the motor current limit;
determine a first voltage limit-based q-axis current corresponding to a d-axis current having a predetermined minimum value and corresponding to the voltage constraint of the DC bus;
determine a second voltage limit-based q-axis current corresponding to the d-axis current having a predetermined maximum value and corresponding to the voltage constraint of the DC bus;
determine one of the first motor current-based q-axis current and the first voltage limit-based q-axis current having a lesser value;
determine one of the second motor current-based q-axis current and the second voltage limit-based q-axis current having a lesser value; and
select one of the motor current-based torque limit and the voltage-based torque limit based on the one of the first motor current-based q-axis current and the first voltage limit-based q-axis current having the lesser value and based on the one of the second motor current-based q-axis current and the second voltage limit-based q-axis current having the lesser value.

16. The control system of claim 15, wherein selecting the one of the motor current-based torque limit and the voltage-based torque limit further comprises the instructions causing the processor to:
select the motor current-based torque limit as the final torque limit in response to determining the first motor current-based q-axis current being less than the first voltage limit-based q-axis current, and the second motor current-based q-axis current being less than the second voltage limit-based q-axis current; and
select the voltage-based torque limit as the final torque limit in response to determining the first voltage limit-based q-axis current being less than the first motor current-based q-axis current, and the second voltage limit-based q-axis current being less than the second motor current-based q-axis current.

17. The control system of claim 14, wherein arbitrating between the voltage-based torque limit and the motor current-based torque limit further comprises the instructions causing the processor to:
determine a first motor current-based q-axis current corresponding to a d-axis current having a predetermined minimum value and corresponding to the motor current limit;
determine a second motor current-based q-axis current corresponding to the d-axis current having a predetermined maximum value and corresponding to the motor current limit;
determine a first voltage limit-based q-axis current corresponding to a d-axis current having a predetermined minimum value and corresponding to the voltage constraint of the DC bus;
determine a second voltage limit-based q-axis current corresponding to the d-axis current having a predetermined maximum value and corresponding to the voltage constraint of the DC bus;
determine one of the first motor current-based q-axis current and the first voltage limit-based q-axis current having a lesser value;
determine one of the second motor current-based q-axis current and the second voltage limit-based q-axis current having a lesser value;
determine the one of the second motor current-based q-axis current and the second voltage limit-based q-axis current having the lesser value corresponding to a different constraint from the one of the first motor current-based q-axis current and the first voltage limit-based q-axis current having the lesser value;
determine a d-axis intersection current value where a q-axis current corresponding to the motor current limit is equal to a q-axis current corresponding to the voltage constraint of the DC bus; and determine the final torque limit based on the d-axis intersection current value and based on the q-axis current corresponding to each of motor current limit and the voltage constraint of the DC bus.

18. The control system of claim 11, wherein determining the regenerative current-based torque limit further comprises the instructions causing the processor to determine a regenerative current and motor current-based torque limit based on an intersection of d-axis and q-axis currents to satisfy each of the receive rating and the motor current limit.

19. The control system of claim 18, further comprising the instructions causing the processor to:
calculate a voltage generated by the inverter based on the regenerative current and motor current-based current limit; and
determine if the voltage generated by the inverter based on the regenerative current and motor current-based current limit satisfies the voltage constraint of the DC bus to verify the intersection of d-axis and q-axis currents to satisfy each of the receive rating and the motor current limit.

20. The control system of claim 11, further comprising the instructions causing the processor to:
calculate a first y-intercept of a plot of d-axis current versus q-axis current, with the d-axis current and the q-axis current each corresponding to the inverter satisfying the receive rating;
calculate a second y-intercept of the plot of d-axis current versus q-axis current, with the d-axis current and the q-axis current each corresponding to the inverter satisfying the receive rating; and
determine if the electric machine can be operated in an a regenerative mode while satisfying the motor current limit, including, based on a velocity of the electric machine, one of:
determine if the motor current limit is greater than the first y-intercept of the plot of d-axis current versus q-axis current, and the first y-intercept of the plot of d-axis current versus q-axis current is greater than a negation of the motor current limit, and the negation of the motor current limit is greater than the second y-intercept of the plot of d-axis current versus q-axis current; and
determine if: the motor current limit is less than the first y-intercept of the plot of d-axis current versus q-axis current, and the motor current limit is greater than the second y-intercept of the plot of d-axis current versus q-axis current, and the negation of the motor current limit is less than the second y-intercept of the plot of d-axis current versus q-axis current.

* * * * *